UNITED STATES PATENT OFFICE.

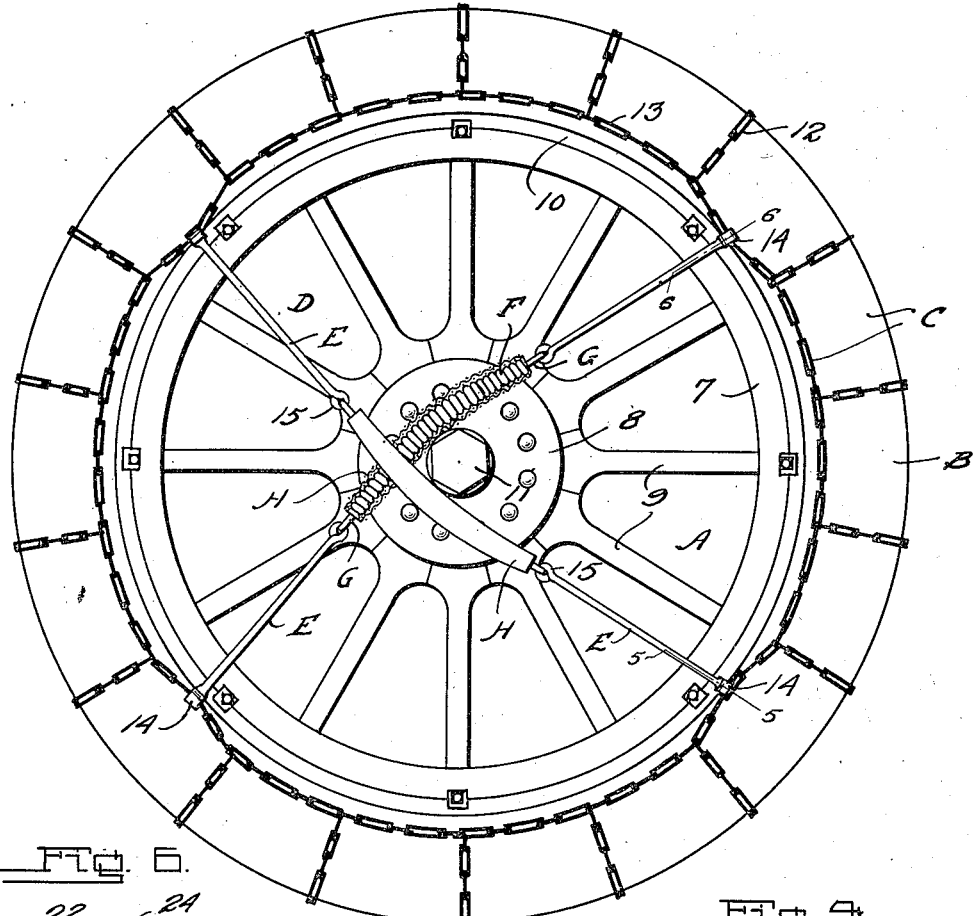

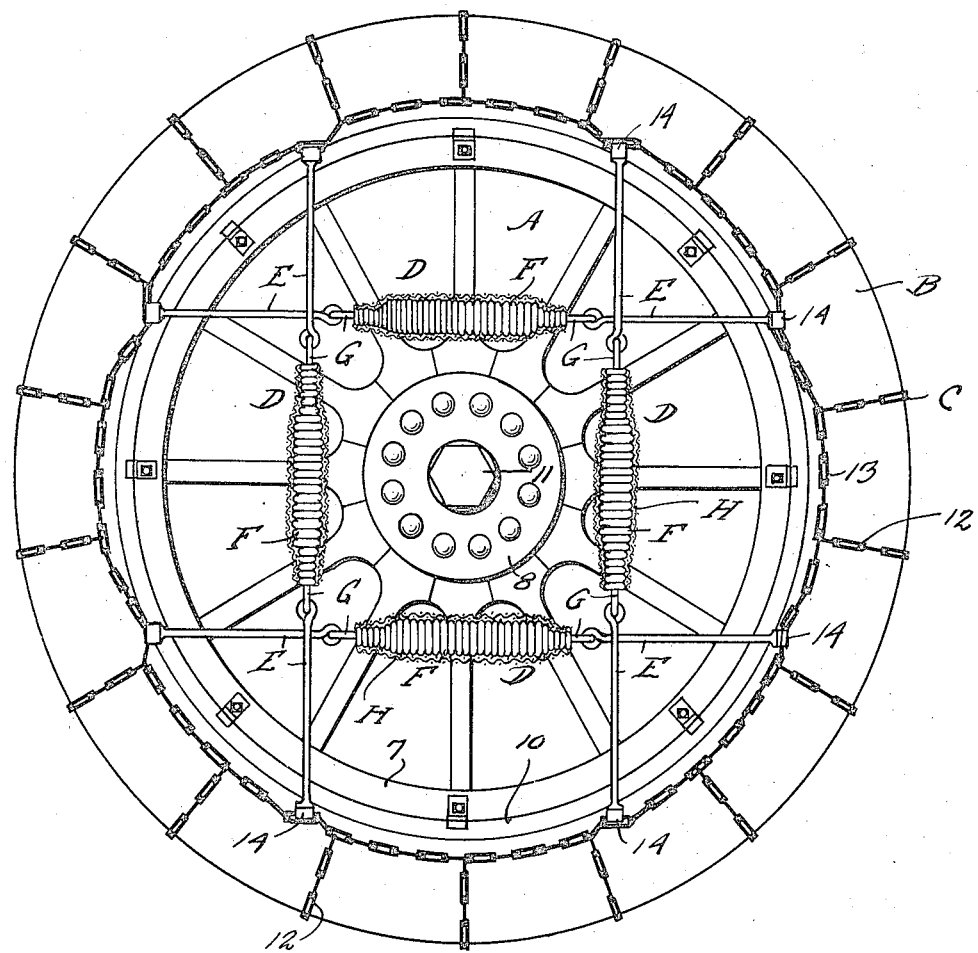
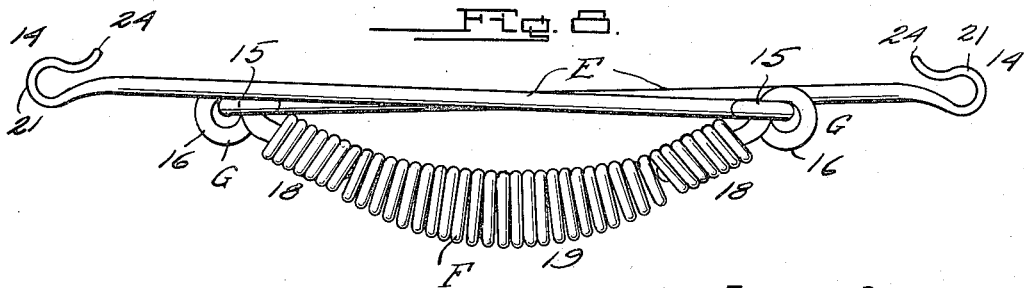

JOSEPH T. BERANEK, OF MOUNT PLEASANT, PENNSYLVANIA.

TIRE-CHAIN RETAINER.

1,244,018.   Specification of Letters Patent.   Patented Oct. 23, 1917.

Application filed July 31, 1916. Serial No. 112,326.

*To all whom it may concern:*

Be it known that I, JOSEPH T. BERANEK, a citizen of the United States, and resident of Mount Pleasant, in the county of Westmoreland and State of Pennsylvania, have invented a certain new and useful Improvement in Tire-Chain Retainers, of which the following is a specification.

My present invention relates to tire chain retainers.

The principal objects of my invention are to provide neat and efficient retainers for tire chains, embodying springs and so constructed that the retainers may be disposed in operative relation to the chains at either side of the vehicle wheel, retaining the chains snugly against the tread of the tire, preventing undue wear of the chain and tire, and avoiding the noise incidental to loose chains striking the mud-guards or other portions of the vehicle; and, to provide tire chain retainers which are inexpensive to manufacture, durable, and easily applied to the chains without removing the wheel or any part of the wheel, but so constructed as to not mar the finish of the hub.

Another object of my invention is to provide tire chain retainers of a size which may be used in connection with a wide range of tire chains,—of large, medium, or small diameters, when in use—making it unnecessary for dealers to carry in stock a number of sizes of chain retainers.

Other objects of my invention will appear in the following detailed description, taken in connection with the accompanying drawings, forming a part of this specification, and in which drawings:—

Figure 1 is a side elevation of a vehicle wheel equipped with a tire, tire chains, and retainers constructed according to my invention, parts being shown in section to disclose details.

Fig. 2 is a plan view of a contraction spring forming a part of a retainer.

Fig. 3 is an enlarged sectional view through the end portion of said spring, showing a coupling in operative relation thereto.

Fig. 4 is a fragmentary perspective view of a link or rod adapted to be pivotally connected with the chain shown in Fig. 2 and to engage the tire chain.

Fig. 5 is an enlarged sectional view on the line 5—5 of Fig. 1.

Fig. 6 is an enlarged sectional view on the line 6—6 of Fig. 1.

Fig. 7 is a side elevation of a vehicle wheel equipped with tire chain retainers constructed according to my invention, the arrangement shown being particularly well adapted for use on wheels embodying chains of large diameter.

Fig. 8 is a plan view of one of the retainers folded into a compact condition.

In the drawings, where similar characters refer to similar parts throughout the several views, A designates a vehicle wheel; B a tire on said wheel; C a tire chain about said tire; D retainers constructed according to my invention, each retainer including links or rods E, a spring F therebetween, and couplings G joining one end of each link or rod to spring F. A cushion H may be carried by spring F to prevent the same from marring parts of the wheel.

In the example shown, the wheel A comprises the felly 7, hub 8, and spokes 9 therebetween, the wheel being provided with a demountable rim 10 to facilitate removal of the tire B from felly 7. The hub 8 includes the usual hub cap 11.

The invention is susceptible of application to any type of tire chain where it is desirable to draw transverse members 12 of the chain in close engagement to the tire tread, and in the examples shown, these members 12 are carried by the connecting portion 13, in the form of a chain, it being understood that there is one connecting portion 13 at each face of the wheel.

Referring now to the retainers D, the links E are preferably in the form of rods, one end portion of each rod adapted to be connected with the chain 13, as by hook 14, while the portion of the rod opposite to hook 14 may be provided with eye 15 adapted to engage an eye 16 of coupling G. These couplings may be provided with screw-threads 17 to fit between convolutions of the spring F at end portions of the latter. It is preferred to construct the spring F with its end portions 18 of a diameter less than the main body portion 19, the couplings G being turned into the reduced portions 18 of the spring, and, if desired, may be secured in place by a filler 20, such as solder.

As to the cushion H, it may be of fabric, rubber, or other yieldable material, and may entirely encircle the spring F to prevent contact thereof with the hub 8.

Referring more particularly to the approved means of connecting the rods or links E to the connecting portions or chains 13, the hook 14 may include an arcuate portion 21 to receive one of the longitudinal portions 22 of one of the links of chain 13, the opening 23 to said arcuate portion 21 being of a width less than the thickness of the said longitudinal portion of the link and a beak 24 may extend from arcuate portion 21 to facilitate the guiding of the longitudinal portion 22 into operative relation to the hook.

As shown in Fig. 5, the hook 14 may be placed through the link, engaging only one of the longitudinal portions 22 thereof, or if desired, as shown in Fig. 6, the hook may be passed to lie in one side of the link and engage both of the longitudinal portions 22 thereof, and one longitudinal portion being received by arcuate portion 21, while the other longitudinal portion engages the beak 24. It is preferred to form the hook 14 integral with rod E and spring temper the same after it has been flattened as clearly shown in Fig. 4.

In assembling the chain retainer into operative relation to the tire chain, the operator has merely to connect the links or rods E with the circumferentially extending member of the tire chain, at one face of the wheel, and force the spring F to assume an arcuate position about the hub 8, as shown in Fig. 1. Because of the connection of spring F with the ends of rods E, the retainer may be placed at the outer or inner face of the wheel, the spring assuming an arcuate position about any obstruction, such as the hub.

In Fig. 7, I have shown the wheel and chain equipped with four chain retainers symmetrically disposed, this arrangement being particularly well adapted for use on wheels of large diameter, the retainers engaging the links of chain 13 at a number of points. Where the wheel is of a small diameter, the effective length of the retainer may be reduced by arching the spring about the hub, as shown in Fig. 1 of the drawings, whereas, if the wheel is of a medium or large diameter, retainers of the same size as shown in Fig. 1 may be used in an effective manner for retaining the chain in place, so that it is unnecessary for a dealer or vender of the retainers to carry a number of sizes in stock.

Any number of retainers may be disposed in operative relation to the tire chain, sufficient to retain it against displacement due to centrifugal forces, and a broken retainer may be readily replaced without discarding any coacting retainers, and providing means for holding the tire chain in place which is inexpensive to maintain in good repair. Because of the pivotal connections between the rods and spring, the retainer may be folded when not in use to a very compact condition, as shown in Fig. 8 of the drawings.

Changes in details may be made without departing from the spirit or scope of my invention; but,

I claim:—

1. As an article of manufacture, a retainer for tire chains comprising a pair of rods of substantially equal length having flat relatively broad overturned ends forming hooks on one end of each rod, and a lengthwise yieldable spring permanently secured at its ends to the opposite ends of the rods.

2. As an article of manufacture, a retainer for tire chains comprising a pair of rods of substantially equal length having hooks on one end, and a lengthwise yieldable spring permanently and pivotally connected at opposite ends to the opposite ends of the rods, the opposite ends of the spring being reduced in diameter, and the rods being foldable about their pivotal connection into engagement against the side of the spring.

3. In combination with a vehicle wheel, a tire thereon, and a tire chain about said tire, of two links, one end of each link connected with said chain, and the points of connection of said links being substantially diametrically opposite one another, and a single spring connecting said links and adapted to be arched about the hub of said wheel to tension the links.

4. An anti-skid chain attachment comprising a unitary structure including the following combination, a contraction spring, and a rod pivoted at one end to each extremity of the spring and having a rigid hook on its free end opening toward the spring and adapted to engage a link of said chain, said spring being adapted to retain the rods from swinging outwardly from the wheel to which the chain is applied and thereby retaining the hooks in engagement with the links.

JOSEPH T. BERANEK.